United States Patent [19]

Buttgereit

[11] 4,140,414
[45] Feb. 20, 1979

[54] WEDGE-CLAMPED SCAFFOLD JOINT

[75] Inventor: Klaus Buttgereit, Plettenberg, Fed. Rep. of Germany

[73] Assignee: Plettac GmbH, Plettenberg, Fed. Rep. of Germany

[21] Appl. No.: 874,917

[22] Filed: Feb. 2, 1978

[30] Foreign Application Priority Data

Feb. 3, 1977 [DE] Fed. Rep. of Germany ....... 2704398

[51] Int. Cl.² .......................... F16B 9/02; F16B 7/04; F16C 11/00; F16D 1/12
[52] U.S. Cl. ..................................... 403/71; 403/49; 403/257; 403/374; 403/409; 248/222.4; 211/182
[58] Field of Search .................. 403/49, 201, 254, 71, 403/257, 70, 263, 68, 353, 69, 374, 409; 248/188, 222.4, 223.1, 223.2, 243, 73; 211/186, 187, 189, 190, 182

[56] References Cited

U.S. PATENT DOCUMENTS

| 2,471,839 | 5/1949 | Schumacher | 248/243 UX |
| 3,179,212 | 4/1965 | Gostling | 403/49 X |
| 3,288,192 | 11/1966 | Bollinger | 403/353 X |
| 3,434,748 | 3/1969 | Leurent | 403/257 |
| 3,672,710 | 6/1972 | Kroopp | 403/201 |
| 3,695,649 | 10/1972 | Lavergne | 403/201 |
| 4,040,754 | 8/1977 | Burroughs | 403/374 X |

FOREIGN PATENT DOCUMENTS

| 60455 | 4/1954 | France | 403/201 |
| 91851 | 6/1958 | Norway | 403/353 |

Primary Examiner—Wayne L. Shedd
Attorney, Agent, or Firm—Michael J. Striker

[57] ABSTRACT

An arrangement for connecting the ties to the uprights of a scaffolding includes a plurality of vertically elongated openings in the uprights, an end projection on a wedge-shaped end plate of the tie which has an enlarged end portion which is introduced into the interior of the upright through an enlargement of the opening while the stem of the projection is received in the opening when the enlarged end portion of the projection is received in the interior of the tubular upright, and a wedge element which is permanently mounted on the projection and interposed between the upright and the wedge-shaped end plate of the tie in the assembled position of the tie with the upright. The wedge-shaped end plate of the tie may be mounted on the remainder of the tie for pivoting relative thereto, and the remainder of the tie may consist of two or more components of similar configurations which are respectively received one within the other, being arrestable in a plurality of arresting positions to change the effective length of the tie.

24 Claims, 16 Drawing Figures

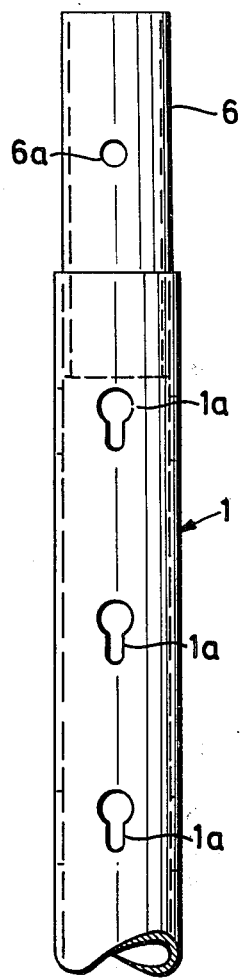
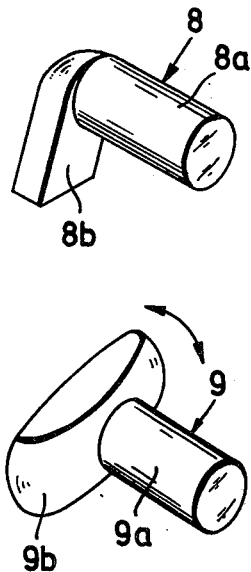
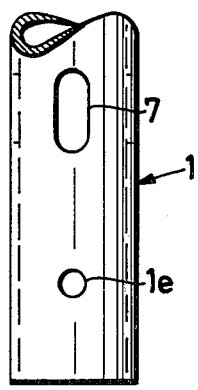
FIG. 10
FIG. 11
FIG. 9

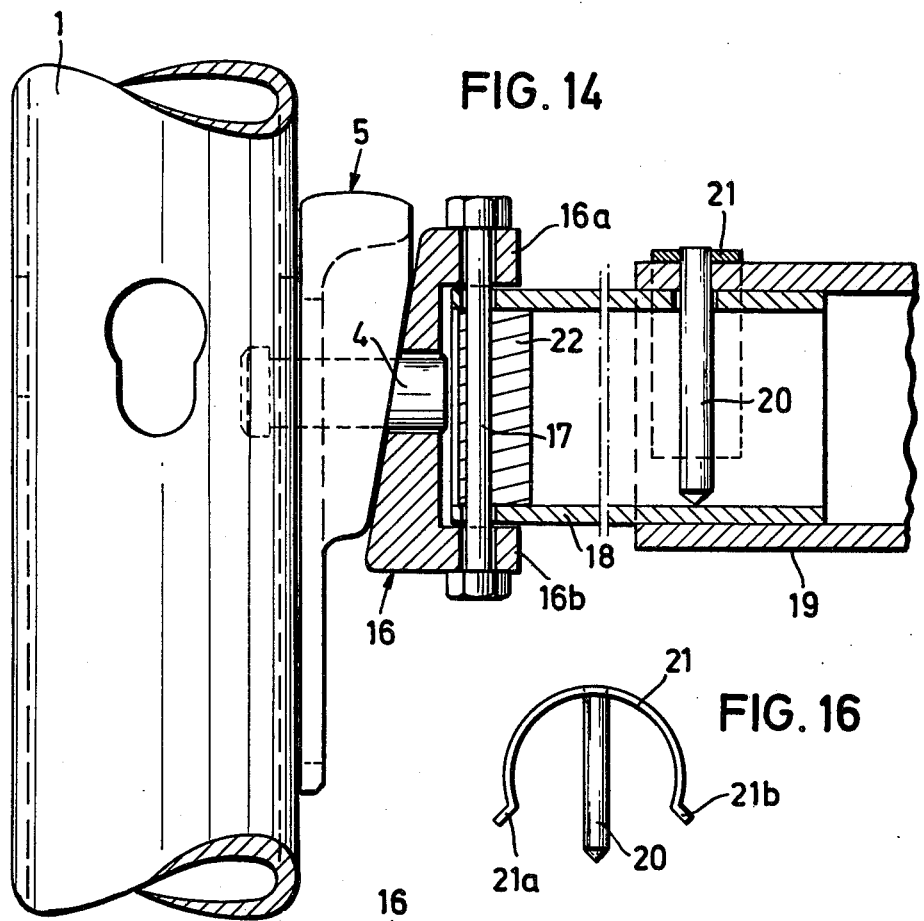
FIG. 14
FIG. 16
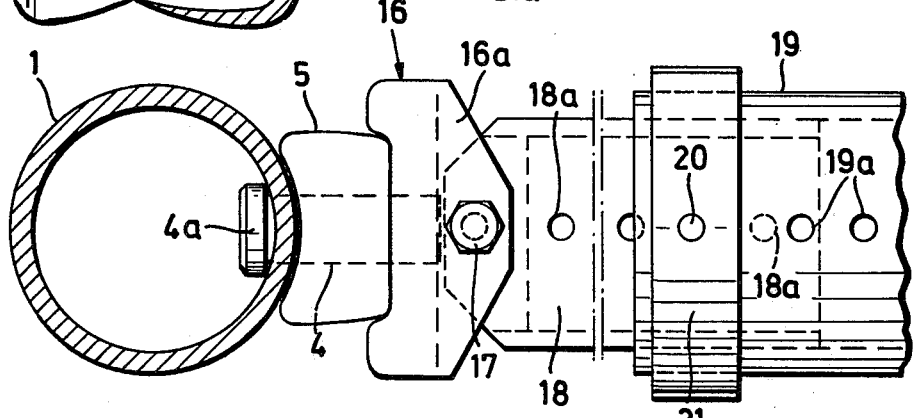
FIG. 15

WEDGE-CLAMPED SCAFFOLD JOINT

BACKGROUND OF THE INVENTION

The present invention relates to a wedge connection for detachably connecting a plurality of support elements to one another in general, and more particularly to a connecting arrangement to be used for connecting the horizontal ties to the uprights of scaffoldings, storage racks, shelvings and similar structures.

There are already known support elements which are so constructed that they can be connected by means of a wedge connection. However, these conventional wedge connections are possessed of an important disadvantage in that rosettes, brackets, lugs, perforated plates or similar connectors must be permanently connected to the uprights, for instance, by welding. The welding of these connecting elements to the uprights of the scaffolding is quite disadvantageous, particularly inasmuch as it is rather expensive, both in terms of material and labor. The labor expenditure is especially important inasmuch as the welding must be performed by highly qualified personnel. A further drawback of these conventional connecting arrangements is that the abovementioned connecting elements which are welded to the uprights substantially increase the overall weight of the respective uprights. The manufacturing cost and the weight of the upright increases with the increasing number of the connecting elements which are welded to the respective upright. In order to keep the above-mentioned parameters within acceptable limits, the abovementioned connecting arrangements are provided only at relatively large distances of 50 centimeters or more, as considered in the longitudinal direction of the upright. A still further disadvantage of the use of the connecting elements which are welded to the uprights is that these connecting elements extend radially outwardly beyond the periphery of the tubular upright proper, so that the finished uprights are very bulky, that is, they require a substantial amount of time both during the transportation and during the storage thereof. In addition thereto, the connecting elements of different uprights are likely to engage one another during the storage or transportation so that it is impossible, for instance, to withdraw the relatively long uprights from a storage location or from a truck in the longitudinal direction of the respective upright. Rather, each individual upright must be lifted upwardly before it can be displaced longitudinally thereof. Even under these circumstances, it is very difficult if not impossible to absolutely avoid engagement of the various connecting elements of the different uprights with one another during the longitudinal withdrawal of the respective upright. All of these factors significantly detract from the utility, convenience and speed of handling of the support elements which are to be used to erect a scaffolding or the like. These disadvantages are especially pronounced when the conventional connecting arrangements are used on the constituent elements of a scaffolding inasmuch as the scaffolding is to be frequently erected, dismantled, transported to a different location or stored at a storage facility.

SUMMARY OF THE INVENTION

Accordingly, it is a general object of the present invention to avoid the disadvantages of the prior art.

More particularly, it is an object of the present invention to provide a connecting arrangement, particularly for connecting the ties to the uprights of a scaffolding, which is not possessed of the disadvantages of the prior-art connecting arrangements.

A further object of the present invention is to develop a connecting arrangement of the type here under consideration which is simple in construction, easy to handle, inexpensive to manufacture, both in terms of labor and material, and reliable nevertheless.

A concomitant object of the present invention is to so construct the connecting arrangement that the weight of the respective upright of the scaffolding is kept to a minimum without appreciably reducing its resistance to deformation.

It is a still other object of the present invention to develop and upright for use in scaffoldings and the like which is less bulky than, and thus easier to handle when compared to, a conventional upright of the same type.

In pursuance of these objects and others which will become apparent hereafter, one feature of the present invention resides, in a support structure, particularly scaffolding, storage rack, shelving and the like, briefly stated, in a combination comprising a first support element having a contact surface; a second support element having a reaction surface which bounds a converging gap with the contact surface when the support elements assume an assembling position relative to one another; and means for detachably connecting the support elements to each other in the assembling position thereof, including a projection rigid with and extending beyond the reaction surface of the second support element, means for defining at least one recess in the first support element at the contact surface thereof which arrestingly receives the projection in the assembling position, and a wedge element interposed in the converging gap between the contact and reaction surfaces of the support elements in the assembling position. Advantageously, the second support element includes a body member and a reaction member which is connected to the body member and has the reaction surface.

Several important advantages are achieved when the connecting arrangement is constructed in the manner indicated just previously. These advantages become especially important in view of the fact that the number of the connecting arrangements which are being manufactured in the manufacturing plant for the scaffoldings, shelvings, support or storage racks and the like, is considerable. One of these advantages is that the support elements can be manufactured much more economically and at a lower cost than the conventional support elements of this type, which is a very important consideration, especially when the support elements are used in scaffoldings or the like. This is attributable to the fact that it is much less expensive both in terms of skilled labor and machinery, to manufacture the recesses than the welded rosettes, lugs, perforated plates, brackets or the like. In addition thereto, the weight of, for instance, an upright of a scaffolding, will not be increased by the connecting arrangement of the present invention so that the connecting arrangements can be arranged on the uprights at much shorter distances than heretofore known, as a result of which the scaffolding will be capable of use in many more applications and in more advantageous ways than the scaffoldings equipped with the conventional connecting arrangements of this type. In addition thereto, the present invention also avoids the bulkiness of this support element, such as the upright of the scaffolding, so that not only is there obtained a saving of the storage and transportation space, but also the support elements, which usually have a substantial length, can be removed longitudinally thereof from a stack in a storage facility, or from an array of these support elements loaded on or in a truck, individually and without encountering any problems which would otherwise arise if the support elements had any outwardly projecting portions.

As a result of the fact that the weight of the upright is kept to a minimum and the handling of the upright is simple, it is possible to make the uprights substantially longer than heretofore customary. So, for instance, the increase in length of the uprights may amount to 50% and more; thus, for instance, the uprights may be 6 meters in length and still be capable of being handled by only one person both during the transportation and the erection thereof, while the conventional uprights, under usual circumstances, cannot exceed the length of 4 meters since otherwise they could not be handled by only one person.

As already mentioned, the preferred use of the connecting arrangement of the present invention is in scaffoldings and similar structures and the support elements are elongated. Then, it is advantageous to arrange the reaction member at least at one end of the second support element, but preferably to arrange two such reaction members, one at each of the ends of the second support element.

A particularly advantageous embodiment of the present invention is obtained when the defining means includes a wall portion of the first support element and the recess is a through opening in the wall portion. Then, it is advantageous for the projection to include a stem received in the opening and an enlarged free end portion which engages behind the wall portion in the assembling position. In this connection, it is particularly advantageous when at least the first support element is tubular, preferably even the second support element, in which event the above-mentioned wall portion is an arcuate portion of the circumferential wall of the tubular first support element. Then, it is further proposed by the present invention to provide the wedge element with an engaging surface which contacts the contact surface of the first support element in the assembling position and is part-cylindrical in conformity to the curvature of the contact surface.

Especially for the above-mentioned use in scaffoldings, wherein the first support element is an upright and the second support element is a horizontal tie, it is advantageous when the through opening is elongated longitudinally of the first support element, having an enlargement at one end thereof, preferably at the upper end.

It is particularly advantageous when the wedge element is permanently attached to the support element so that it cannot become lost or misplaced. Then, it is particularly advantageous when the wedge element has an elongated slot of a predetermined width and when the above-mentioned projection is received in the elongated slot of the wedge element for shifting and rotation of the wedge element relative to the projection, the above-mentioned enlarged end portion of the projection forming a collar which has dimensions exceeding the width of the elongated slot of the wedge element and thus preventing the latter from sliding off from the projection.

It is further proposed according to an additional advantageous aspect of the present invention to form the wedge element with a U-shaped ridge at that face thereof which is juxtaposed with the reaction surface of the reaction plate, the ridge contacting the reaction surface in the assembling position. Then, it is further advantageous when the reaction member has a pair of parallel ribs which outwardly embrace the U-shaped ridge of the wedge element in the assembling position.

In order to be able to use the support elements of the present invention in a variety of applications, that is, to be able to erect differently configured scaffoldings or the like therefrom, it is further currently preferred to have the defining means define a plurality of additional recesses which are similar to and spaced from the above-mentioned one recess, either longitudinally or circumferentially of the first support element, or both.

A further advantageous aspect of the present invention resides in the possibility of conforming the course of the scaffolding or the like to the requirements and to the available space. This is rendered possible in a very simple manner when the reaction member is pivotally connected to the body member of the second support element. A particularly simple arrangement is obtained when the pivotally mounting means includes a mounting section of one of the members, a pivot mounted on the mounting section, and a projecting section of the other of the members which is mounted on the pivot for pivoting. It is especially advantageous when the mounting section is bifurcated and has two arms which embrace the projecting section of the other member, the pivot passing through both of the arms of the bifurcated mounting section. Then, the birfucated mounting section is preferably so configured as to permit the projecting section to pivot relative thereto about the pivot through approximately 180°.

Under these circumstances, that is, when it is desired to construct scaffolding or the like which are other than rectangular in top-plan view, it is further advantageous as proposed by the present invention when the second support element includes at least two tubular components which are telescopically received within one another, and when there is provided a means for arresting the tubular components in a plurality of telescoped arresting positions with respect to one another. An especially advantageous and simple arresting means is obtained when the components include a plurality of orifices at least two of which are aligned with one another in each of the arresting positions, under which circumstances the arresting means includes at least one arresting pin which is received in the aligned orifices in the one arresting position. Advantageously, the arresting means further includes a resiliently yieldable bracket which is rigidly connected to a gripping portion of the arresting pin and which partially embraces the second support element in each of the arresting positions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 9 is a side elevational view of an upright which is ready for establishing several of the connections of the present invention;

FIG. 10 is a perspective view of a modified projection for use in the connecting arrangement of FIG. 1;

FIG. 11 is a perspective view similar to FIG. 10 but of another modification of the projection;

FIG. 14 is a partially sectioned side elevational view of a modified connecting arrangement of the present invention wherein the tie is pivotably and telescopically extensably connected to the upright;

FIG. 15 is a top-plan view of the connecting arrangement of FIG. 14 with a cross-section of the upright; and FIG. 16 is a side-elevational view of a pivot equipped with an elastically yieldable bracket which can be used in the connecting arrangement of FIG. 14.

DESCRIPTION OF THE PREFERRED EMBODIMENTS

Figure 1:
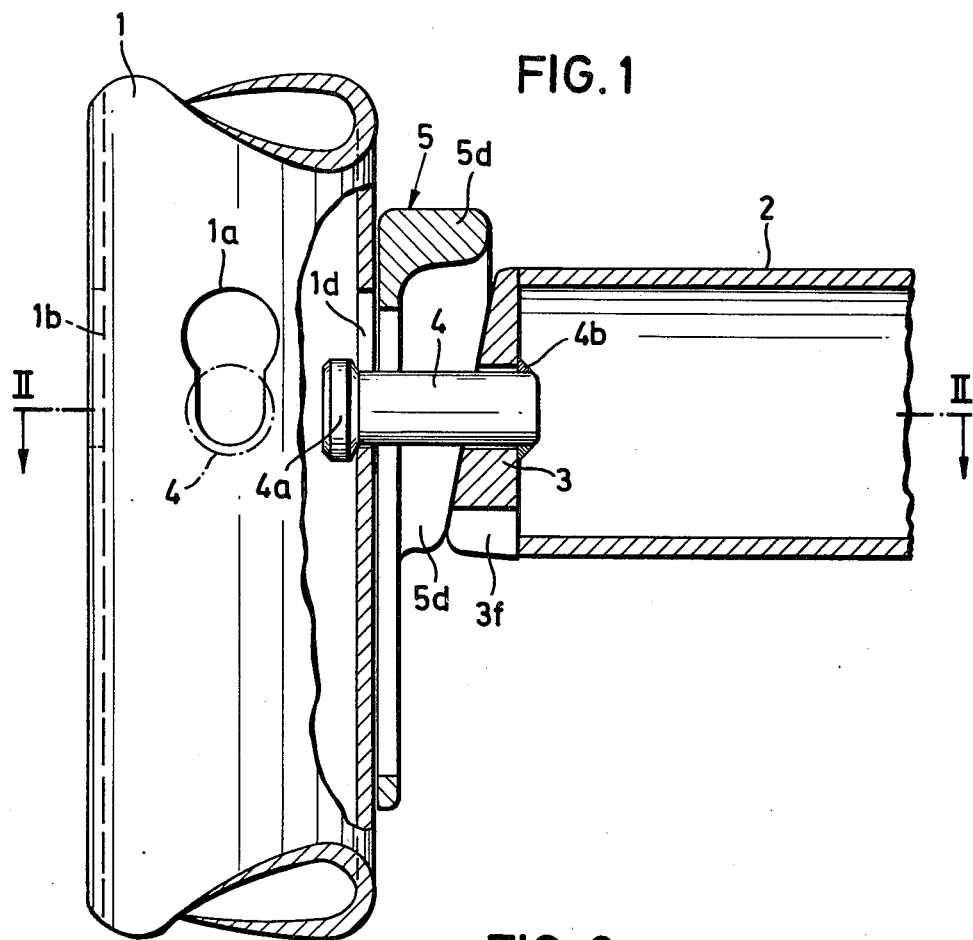
FIG. 1 is a partial vertical section through a connecting arrangement of the present invention as used to connect a tie of a scaffolding to an upright thereof.
Figure 2:
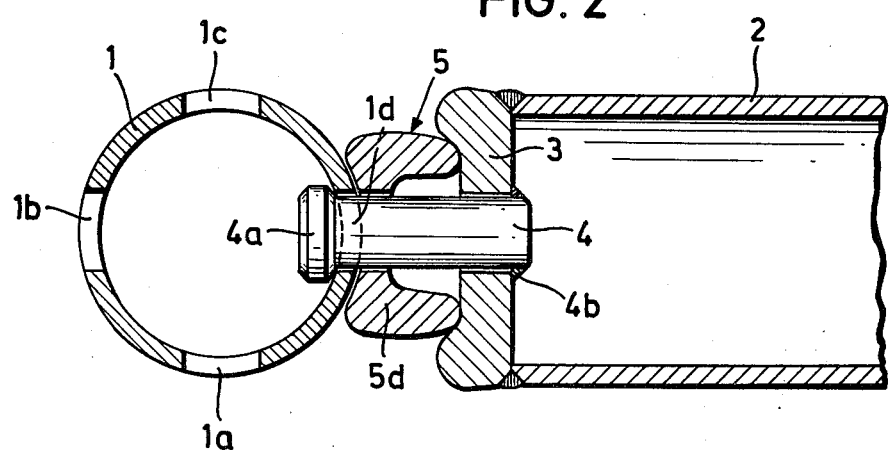
FIG. 2 is a horizontal sectional view taken on line II—II of FIG. 1.

Referring now to the drawing in detail, and first to FIGS. 1 and 2 thereof, it may be seen that they illustrate a connecting arrangement for detachably connecting two or more support elements to one another. As illustrated, the connecting arrangement connects an upright 1 of a scaffolding with a horizontal tie 2 of the scaffolding. Advantageously, the upright 1 is constituted by a cylindrical tube, for instance a galvanized steel tube, which has a length and a diameter in accordance with the particular requirements in the application for which the upright 1 is to be used.

The upright 1 has an elongated opening 1a at each location at which the connection between the upright 1 and the tie 2 is to be established. As illustrated in FIG. 1, it is advantageous to make the opening 1a with an enlarged upper end for reasons which will become apparent as the discussion proceeds. It is particularly advantageous when, in addition to the above-mentioned opening 1a, there are provided similar openings 1b, 1c and 1d which are so distributed at the same elevation about the circumference of the upright 1 that they respectively are located opposite to one another or are spaced from each other by an angle of 90°, respectively. However, it will be understood that, depending on circumstances, any other number and distribution of the openings 1a, 1b, 1c, 1d and so on, could be made at the same elevation or even at different elevations of the upright 1. While it is true that the openings 1a, 1b, 1c and 1d detract from the strength of the upright 1, this disadvantageous effect is, for all intents and purposes, insignificant. So, for instance, calculations and practical tests have established that, for the customary diameter of the upright 1 amounting to 48.3 millimeters, the same heights of the scaffolding as those with the conventional uprights can be achieved, even when a plurality of the uprights 1 is arranged one on top of the other.

Referring now to FIG. 9, it may be seen that it illustrates the upright 1 in its erect position, ready for establishing the connections of the present invention. The upright 1 is provided, at short distances amounting to, for instance, 20 centimeters and along parallel or coaxial generatrices about one another, with the openings 1a. In order to be able to interconnect a plurality of the uprights, one on top of the other, a tubular sleeve 6 with a transverse bore 6a is provided at the upper end of each upright 1. Correspondingly thereto, a further transverse bore 1a is provided at the lower end of the upright 1. Then, non-illustrated bolts or pins are passed through the transverse bores 6a and 1a to obtain, in a conventional manner, the connection between the superimposed uprights 1.

Returning now to FIGS. 1 and 2, it may be seen therein that the generally horizontally extending tie 2 advantageously also is constituted by a cylindrical tube. However, it is also possible to configurate the uprights 1 and/or the ties 2 differently; so, for example, the uprights 1 and/or the ties 2 could be rectangular, square or U-shaped in cross-section. It will be appreciated that the connecting arrangement of the present invention can be utilized even under these circumstances. A reaction member 3, preferably shaped as a disk or a plate, is connected to the end of the tie 2, as illustrated, rigidly connected, advantageously by welding. It is self-evident that, for use in scaffoldings, the ties 2 will be provided with the reaction members 3 at both of their ends, in order to establish the inventive connection with other uprights 1 which are located at the other ends of the respective ties 2 and which constitute the scaffolding together with the illustrated upright 1. However, in order not to unduly encumber the drawings and to simplify the discussion, the other uprights 1 and the additional ties 2 of the scaffolding in which the connecting arrangements of the present invention are used will not be described in any great detail so that it should be borne in mind that, while only one of the connecting arrangements will be discussed, in fact there will be a multitude of such connecting arrangements in the scaffolding or the like, or similar to or identical with the illustrated and discussed connecting arrangement.

Figure 6:
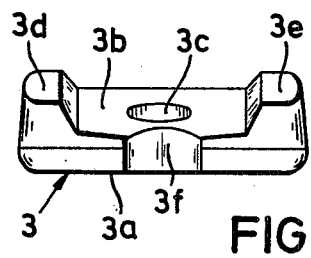
FIG. 6 is a front elevational view of a reaction member of FIG. 1.
Figure 7:
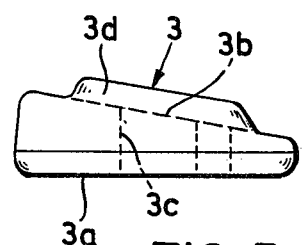
FIG. 7 is a side elevational view of the reaction member of FIG. 6.
Figure 8:
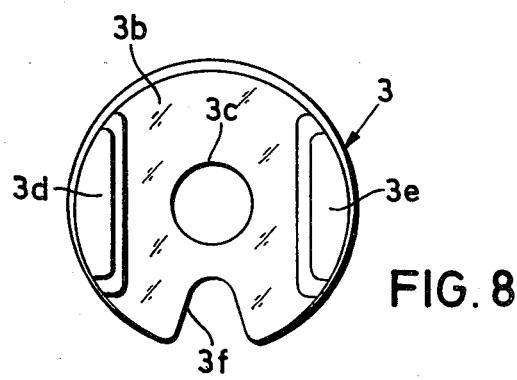
FIG. 8 is a top elevational view of the reaction member of FIG. 6.

The shape of the reaction member 3 will become apparent most clearly from FIGS. 6-8. A surface 3a of the reaction member 3 which faces the tie 2 extends normal to the longitudinal axis of the tie 2. On the other hand, a surface 3b of the reaction member 3 which faces opposite to the surface 3a extends at an angle to the longitudinal axis of the tie 2, thus forming a reaction surface. The angle which the reaction surface 3b encloses with the longitudinal axis of the tie 2 is so selected that the reaction member 3 widens in the downward direction of the tie 2 when the latter is in its assembling position. The reaction member 3 is centrally provided with a bore 3c through which one end of a bolt or another projecting member 4 passes to be connected to another reaction member by a weld 4b. At both sides of the reaction surface 3b, the reaction member 3 is formed with mutually parallel ribs 3d and 3e which embrace, from the outside, lateral surfaces of a U-shaped projection 5d of a wedge element 5 which will be discussed in more detail later on, thus forming a guide therefor. Furthermore the reaction member 3 is advantageously also provided with a zinc flow-off opening 3f which is useful during the galvanizing procedure, provided that the tie 2 with the reaction member 3 undergo the latter.

Figure 3:
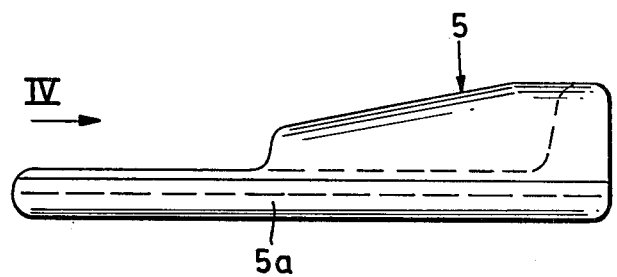
FIG. 3 is a side elevational view of a wedge element according to FIG. 1 in a horizontal position.
Figure 4:
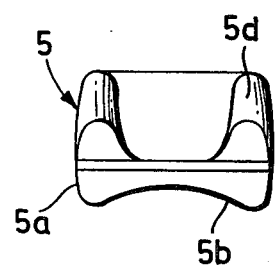
FIG. 4 is a front elevational view of the wedge element taken in the direction of an arrow IV in FIG. 3.

Projecting member or bolt 4 has an enlarged head 4a at its free end which is adapted to engage, in an assembling position of the tie 2 with the upright 1, behind the margins bounding the respective elongated opening 1d from the interior of the tubular upright 1. The above-mentioned wedge element 5 is permanently supported on the bolt 4, its configuration being apparent from FIGS. 3–5. As particularly clearly seen in FIG. 5, the wedge element 5 has an elongated slot 5c the width of which is slightly greater than the diameter of the bolt 4. In this manner, the wedge element 5 can be displaced in its longitudinal direction relative to, or turned about, the bolt 4 in any desired manner. The enlarged head 4a retains the wedge element 5 on the bolt 4 so that the wedge element 5 cannot detach itself from the tie 2 and become lost or misplaced even in the disassembled condition of the tie 2. In order to permanently mount the wedge element 5 on the bolt 4 between the enlarged head 4a and the reaction member 3, the bolt 4 is first introduced into the slot 5c of the wedge element 5 first, and only then the bolt 4 is introduced into the bore 3c of the reaction member 3 and connected to the latter by the weld 4b. Only subsequently thereto is the reaction member 3 connected to the tie 2, for instance, by resorting to a welding operation. It will be appreciated that, inasmuch as the dimensions of the enlarged head 4a of the bolt 4 exceeds the width of the slot 5c of the wedge element 5, the wedge element 5 can no longer dissociate itself from the bolt 4 and become lost.

The wedge element 5 has an elongated portion 5a which has an engaging surface 5b that is to contact the circumferential surface of the upright 1. As illustrated, the circumferential surface of the upright 1 has a circular cross-section, and the engagement surface 5b is made part-cylindrical in conformity with the peripheral surface of the upright 1.

Figure 5:
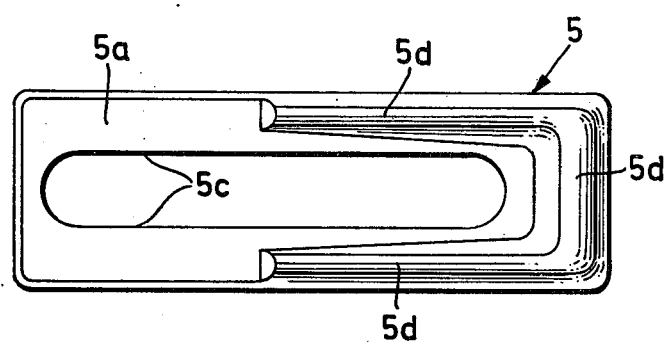
FIG. 5 is a top elevational view of the wedge element of FIG. 3.

As already mentioned above, the wedge element 5 has a U-shaped projection 5d which partially surrounds the slot 5c as illustrated in FIG. 5, the U-shaped projection 5d having an inclined face which is juxtaposed with the reaction surface 3b of the reaction member 3 in the assembling position of the upright 1 with the tie 2. The angle of the reaction surface 3b in the assembling position is the same as that of the above-mentioned face of the U-shaped projection 5d and is so selected as to be within the friction cone so that the wedge element 5 is retained by friction in the gap between the reaction surface 3b and the outer circumferential surface of the upright 1 and cannot accidentally become dislodged therefrom.

Basically, the operation of the above-discussed connecting arrangement is as follows: First of all, the wedge element 5 is displaced upwardly and then the tie 2, which assumes a substantially horizontal position, is so displaced toward the upright 1 that the enlarged head 4a of the bolt 4 passes through the enlarged upper part of the opening 1b. Subsequently thereto, the tie 2 is displaced downwardly relative to the erect upright 1 to the full possible extent, as a result of which the enlarged head 4a of the bolt 4 engages behind the margins which bound the lower part of the opening 1d. Thereafter, the wedge element 5 can be so slid downwardly as to be guided by the ribs 3d and 3e and, finally, the wedge element 5 can be secured in its position by directing downwardly oriented impacts against the same. In this manner, the engaging surface 5b becomes engaged directly with the outer contact surface of the upright 1. The connection between the upright 1 and the horizontally extending tie 2 is extraordinarily rigid, devoid of play and very resistant to angular displacement in all directions. This is a result of the clamping effect between the inner surface of the upright 1 and the outer contact surface of the upright 1, on the one hand, and between the outer contact surface of the upright 1 and the reaction member 3, on the other hand, and due to the rigid connection, for instance, by welding, of the reaction member 3 to the horizontally extending tie 2. The substantial resistance to angular displacement also results from the guidance of the wedge element 5 in the reaction member 3, as well as from the cylindrical configuration of the engaging surface 5b of the wedge element 5 due to which the wedge element 5 is additionally guided on the upright 1.

The wedge element 5 has a reduced thickness at its lower end as seen in the drawing so that it can be rotated relative to the reaction member 3 despite its above-discussed guidance on the upright 1, provided that the bolt 4 has not yet assumed its fully assembled position. In this connection, it is especially advantageous to rotate the wedge element 5 during the assembling operation first through 180° about the bolt 4 with respect to the position illustrated in FIG. 1 so that, initially, the upper part of the wedge element 5 depends downwardly from the bolt 4 during the assembling operation. As a result of this, there exists such an amount of play between the wedge element 5 and the enlarged head 4a of the bolt 4 that it is possible to interconnect, without encountering any difficulty, two stationary uprights 1 by a respective horizontal tie 2, inasmuch as the horizontal tie 2 can be shifted, to a substantial extent, in both longitudinal directions thereof. In other words, it is possible, when the wedge element 5 at one of the ends of the tie 2 depends from the associated bolt 4 in the above-mentioned manner, to introduce the bolt 4 into the interior of the respective upright 1 to such an extent that the bolt 4 which is provided at the other end of the same tie 2 can be comfortably displaced in front of the associated opening 1b of the other upright 1 and the enlarged head 4a of this other bolt 4 can be introduced into this associated opening 1b through the enlarged end thereof. The same is also varied for the simple dismounting, after the two wedge elements 5 present at the two ends of the respective tie 2 have been released by impacting the same, upon which these wedge elements are rotated through 180° about their respective bolts 4 until the upper parts thereof depend from the respective bolts 4 downwardly. In the final fully assembled position, the enlarged head 4a of the bolt 4 cannot deform the margins which bound the respective opening 1a, 1b, 1c or 1d of the upright 1 inasmuch as the engagement surface 5b of the wedge element 5 which is accommodated to the outer contour of the upright 1 exerts a counterpressure on such margins.

Figure 12:
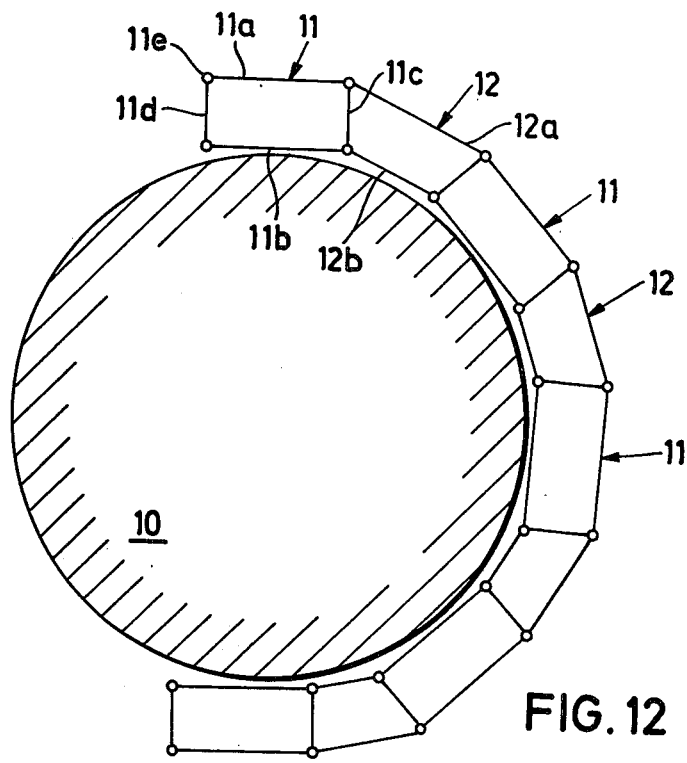
FIG. 12 is a simplified top-plan view of a scaffolding erected around a round building structure.

In the embodiment which is illustrated in FIGS. 1 and 2, the bolt 4 has a substantially cylindrical enlarged head 4a. Instead of this, a bolt 8 illustrated in FIG. 10 could be utilized, which has bolt stem 8a and a bolt head 8b which is enlarged with respect to the bolt stem 8a in the downward direction as illustrated in the drawing. Another exemplary configuration of a different bolt 9 is apparent from FIG. 11. In this embodiment, the bolt 9 has a stem 9a and a head 9b is made integral with the stem 9a and is substantially enlarged to two opposite sides of the stem 9a. When bolts 8 or 9 are to be used, it is advantageous not to make the openings 1a, 1b, 1c or 1d of the shape illustrated, that is, with the enlargement at the upper end thereof. Rather, it is advantageous to shape of the openings 7 as elongated slates, as illustrated at the lower part of FIG. 9. When the tie 2 equipped with the bolts 8 or 9 is to be assembled with the respective upright 1, the tie 2 is first so rotated about its longitudinal axis that the head 8b or 9b extends vertically and can be introduced into the elongated slit 7. Thereafter, the tie 2 is rotated through 90° as a result of which the head 8b or 9b engages behind the margins which bound the elongated slit 7. It is again recommended to give the surface of the head 8b or 9b which faces the interior surface of the tubular upright 1 a part-cylindrical configuration in conformity to the internal surface of the tubular upright 1. In all other respects, this connection is the same as that discussed previously in connection with FIGS. 1–8. In practical applications, it is sometimes required that the scaffolding be erected around a building or a similar structure which has a ground plan different from rectangular. So, for instance, as illustrated in FIG. 12, it is sometimes desired to erect the scaffolding around a building structure than which is circular in top-plan view. Instead of this, however, the facad of the building may be provided with some other arcuate region. In such an event, it is advantageous to erect the scaffolding from different but coordinated scaffolding sections. This is also illustrated in FIG. 10 where the scaffolding includes scaffolding sections 1 which alternate with scaffolding sections 12. The scaffolding section 11 consists of four uprights 11e which are respectively arranged at the corners of an imaginary rectangle, the uprights 11e being interconnected by longitudinally extending ties 11a, 11b, as well as by transversely extending ties 11c and 11d, all of which are connected to the respective uprights 11e by the connecting arrangements which have been discussed previously. It will be appreciated that, while only four of the ties 11a, 11b, 11c and 11d are visible in FIG. 10, such ties will interconnect the uprights 1 at different elevations of the latter at greater or lesser distances from each other in the vertical direction, as desired or needed. On the other hand, inasmuch as the facad of the building structure 10 is cylindrical, the scaffolding section 12 includes ties 12a and 12b of different lengths.

Figure 13:
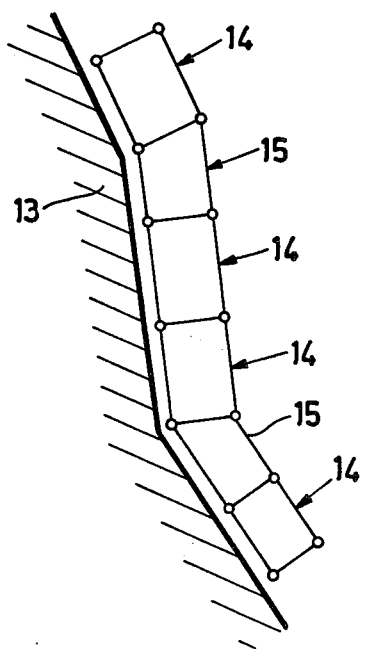
FIG. 13 is a simplified top plan view of a scaffolding which is erected along the facad of a building which has a complex configuration.

Similar conditions also prevail when, as illustrated in FIG. 13, a building structure 13 has a non-planar facad. Here again, scaffolding sections 14 can be assembled in the same manner in a rectangular outline, while other scaffolding sections 15 have ties of different lengths.

Turning now to FIGS. 14–16, it is to be mentioned that the connecting arrangement of the present invention is illustrated therein as being so configurated as to enable the ties of the above-mentioned scaffolding sections to be lengthened or shortened in a simple manner in conformity with the particular requirements. First of all, it may be seen in FIGS. 14 and 15, that a reaction member, here indicated by the reference numeral 16, is pivotally connected to a tie 18 or 19. This pivotal connection is established in that the reaction member 16 has a bifurcated portion consisting of two flanges 16a and 16b which are respectively located at the upper and the lower ends of the reaction member 16. An end section of the horizontal tie 18 is so configurated as to be received between the flanges 16a and 16b of the reaction member 16, and a pivot 17 is supported in the flanges 16a and 16b. The pivot 17 defines a vertical pivot axis for the pivotal connection, permitting the horizontal tie 18, 19 to pivot about the pivoting axis in a horizontal plane through an arbitrary angle within, for instance, 180°. In order to rigidify the tie 18, a rigidifying piece 22 can be inserted into the tie 18. The above-mentioned pivotal connection already provides for a good variation possibility for the formation of the scaffolding sections 12 or 15, while the actual wedge connection of the present invention does not suffer either as to its rigidity or strength.

Now, in order to be able to change the length of the respective ties, whether they be the longitudinal ties, such as 11a, 11b, 12a and 12b, or transverse ties such as 11c, 11d, in order to be able to accommodate the scaffolding sections 11, 12, 14 or 15 to the configuration of the respective facad, the respective ties are so configurated as to be telescopically extensible. As most clearly illustrated in FIGS. 14 and 15, the telescopically extensible horizontal tie 18, 19 includes two pipes 18, 19 which are telescopically received one within the other. The pipes 18, 19 are telescopically shiftable relative to one another and can be arrested in the respective relative positions thereof by means of a pin 20 or the like which is received in at least two of a plurality of transverse bores 18a or 19a of the telescopic tubes or components 18, 19. However, it should be understood that three or more pipes which are telescopically received within one another can be provided instead of the above-mentioned two components 18, 19.

The pin 20 is advantageously configurated in the manner illustrated in FIG. 16, that is, the pin 20 proper carries an elastically yieldable bracket 21 at one of its ends, the bracket 21 partially embracing the horizontal tie 19 in the assembled position of the pin 20. The elastically yieldable bracket 21 advantageously has somewhat bent ends 20a, 20b so as to be able to connect the bracket 21 to the tie 19 with snap action with the pin 20 passing through the openings or bores 18a and 19a until the bracket 21 is disengaged from the tie 19.

It is advantageous when the outer telescopic component 9 has three of the bores 19 therein which are spaced a smaller distance from each other while the inner component 18 has a row of the bores 18a which are spaced a larger distance from each other. In this manner, it is possible to obtain a small-step adjustment of the length of the respective tie 18, 19 with a relatively small number of the bores 18a, 19a by aligning any one of the three bores 19 with any one of the plurality of bores 18a, and by passing the pin 20 through the then aligned bores 18a, 19a.

It will be understood that each of the elements described above, or two or more together, may also find a useful application in other types of constructions differing from the types described above.

While the invention has been illustrated and described as embodied in a connecting arrangement for use in scaffoldings, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a support structure, particularly scaffolding, storage rack, shelving and the like, a combination comprising a first support element having a contact surface; a second support element having a reaction surface which bounds a converging gap with said contact surface when said support elements assume an assembled position relative to one another; and means for detachably connecting said support elements to each other in said assembling position thereof, including a projection rigid with and extending beyond said reaction surface of said second support element, means for defining at least one recess in said first support element at said contact surface thereof which arrestingly receives said projection in said assembling position, and a wedge element interposed in said converging gap between said contact and reaction surfaces of said support elements in said assembled position.

2. A combination as defined in claim 1, wherein said second support element includes a body member and a reaction member connected to said body member and having said reaction surface.

3. A combination as defined in claim 2, wherein said support elements are elongated; and wherein said reaction member is arranged at least at one end of said second support element.

4. A combination as defined in claim 3, wherein said defining means includes a wall portion of said first support element; wherein said recess is a through opening in said wall portion; and wherein said projection includes a stem received in said opening and an enlarged free end portion which engages behind said wall portion in said assembling position.

5. A combination as defined in claim 4, wherein at least said first support element is tubular; and wherein said wall portion is an arcuate portion of the circumferential wall of said tubular first support element.

6. A combination as defined in claim 4, wherein said first support element is an upright and said second support element a horizontal tie of the support structure; and wherein said through opening is elongated longitudinally of said first support element.

7. A combination as defined in claim 6, wherein said elongated through opening has an enlargement at one end thereof.

8. A combination as defined in claim 7, wherein said one end of said opening is the upper end thereo.

9. A combination as defined in claim 2; and further including means for permanently attaching said wedge element to said second support element.

10. A combination as defined in claim 9, wherein said attaching means includes an elongated slot in said wedge element having a predetermined width and receiving said projection for shifting and rotation of said wedge element relative to the latter, and a collar on said projection having dimensions exceeding said width.

11. A combination as defined in claim 2, wherein at least said first support element is tubular and said contact surface thereof is cylindrical; and wherein said wedge element has an engaging surface which contacts said contact surface of said first support element in said assembling position and is part-cylindrical in conformity to said contact surface.

12. A combination as defined in claim 2, wherein said wedge element has a face which is juxtaposed with said reaction surface of said reaction member and a U-shaped ridge at said face which contacts said reaction surface in said assembled position.

13. A combination as defined in claim 12, wherein said reaction member has a pair of parallel ribs which outwardly embrace said U-shaped ridge of said wedge element in said assembled position.

14. A combination as defined in claim 2, wherein said first support element is elongated; and wherein said defining means defines a plurality of additional recesses which are similar to and spaced from said one recess.

15. A combination as defined in claim 14, wherein said additional recesses are spaced from said one recess and from each other longitudinally of said first support element.

16. A combination as defined in claim 14, wherein said first support element has a circular cross section; and wherein said additional recesses are spaced from said one recess and from each other circumferentially of said first support element.

17. A combination as defined in claim 2; and further comprising means for pivotally connecting said reaction member to said body member of said second support element.

18. A combination as defined in claim 17, wherein said pivotally mounting means includes a mounting section of one of said members, a pivot mounted on said mounting section, and a projecting section of the other of said members which is mounted on said pivot for pivoting.

19. A combination as defined in claim 18, wherein said mounting section is bifurcated having two arms which embrace said projecting section; and wherein said pivot passes through both of said arms of said bifurcated mounting section.

20. A combination as defined in claim 19, wherein said bifurcated mounting section is so configurated as to permit said projecting section to pivot relative thereto about said pivot through approximately 180°.

21. A combination as defined in claim 1, wherein said second support element is elongated and includes at least two tubular components which are telescopically received within one another.

22. A combination as defined in claim 21; and further including means for arresting said tubular components in a plurality of telescoped arresting positions with respect to one another.

23. A combination as defined in claim 22, wherein said components include a plurality of orifices at least two of which are aligned with one another in each of said arresting positions; and wherein said arresting means includes at least one arresting pin which is received in said aligned orifices in said one arresting position.

24. A combination as defined in claim 23, wherein said arresting pin has a gripping portion; and wherein said arresting means further includes a resiliently yieldable bracket rigidly connected to said gripping portion of said arresting pin and partially embracing said second support element in each of said arresting positions.

* * * * *